UNITED STATES PATENT OFFICE 2,320,654

SENSITIZATION OF PHOTOGRAPHIC EMULSIONS

Oskar Riester, Dessau-Haideburg, Germany; vested in the Alien Property Custodian No Drawing. Application February 17, 1942, Serial No. 431,265. In Germany August 8, 1940

3 Claims. (Cl. 95—7)

My present invention relates to sensitization of photographic emulsions.

It is known to use for sensitizing silver halide emulsions styryl dyestuffs prepared by condensing nitrogenous heterocyclic bases containing a reactive methyl or methylene group with dimethylaminobenzaldehydes. These styryl compounds are good bleaching out dyestuffs but inferior to other known cyanine dyestuffs, for instance, trimethinecyanines as to intensity of sensitization.

My invention is based on the observation that styryl dyestuffs of the following formula:

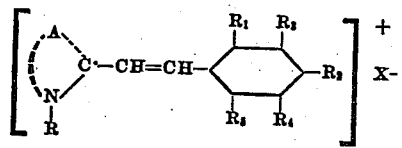

wherein

A stands for groups of molecules necessary to complete a 5- or 6-membered ring usual in cyanine dye art, for instance, indoline, thiazole, oxazole, quinoline, lepidine, benzimidazole, thiodiazole, isofurodiazole, selenazole, and these heterocyclic nuclei in turn may be substituted by alkyl, aryl, benzyl, phenylene, naphthylene or substituted phenyls and heterocyclic radicals or may be condensed with aromatic or heterocyclic rings;

R stands for alkyl, aralkyl, alkylene or alkylene-carboxylic acid;

$R_1$ and $R_2$ stand for hydroxyl or one of the substituents stands for hydroxyl and the other for hydrogen, alkyl, alkoxy, alkthio, carboxyl or the like;

$R_3$ and $R_4$ stand for halogen or one of the substituents stands for halogen and the other for hydrogen, alkyl, alkoxy, alkthio, carboxyl or the like;

$R_5$ stands for hydrogen, alkyl, alkoxy, alkthio, carboxyl or the like;

X stands for an acid radical, for instance, Cl, Br, I, $SO_4$, $ClO_4$, $SO_3H_3$, $SO_3C_2H_5$, and $SO_3.C_6H_4.CH_3$, are valuable which can completely be removed from the photographic layers already during the photographic process, that is during developing and fixing. The dyestuffs, therefore, are useful especially in cases it is of importance to obtain photographic layers fully undyed particularly in the manufacture of photo-technical materials, photographic papers and photographic materials for scientific purposes. The dyestuffs of the present invention are very good sensitizers chiefly for silver chloridebromide emulsions preferred for photographic papers and photo-technical materials. Moreover, the emulsions can be sensitized for a large range of the spectrum by the new dyestuffs in any way. Thus it is possible to obtain, for instance, panchromatic sensitizers and ortho-chromatic sensitizers, the sensitization curve of which falls away especially favorably and steeply towards the long-wave lengths.

The dyestuffs of the present invention are prepared by reacting a nitrogenous heterocyclic base carrying a reactive methyl or methylene group with a halogenhydroxybenzaldehyde, if necessary in the presence of a solvent.

The structure of these dyestuffs may be represented by the following formula of the quinoid type:

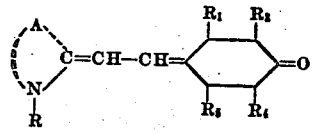

or

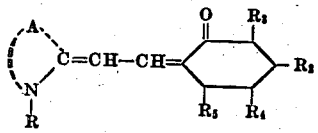

It is, however, more accurate to give the dyestuffs a betaine-like structure of the intramolecular ionoid type:

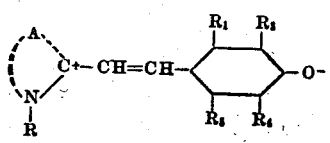

or

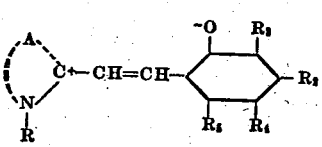

The following examples are illustrative of my invention but they are not intended to be limiting.

Example 1

A mixture of 3 g. of 2-methylbenzoxazole ethyl-iodide, 3 g. of 3.5-dibromo-4-hydroxy-benzaldehyde and 1 cc. of isoquinoline is melted at 110° C. for 10 minutes while stirring. The still hot melted mass is then dissolved in methanol and mixed with about 30 cc. of a 12% solution of sodium acetate in methanol. A dyestuff of the following constitution crystallizes:

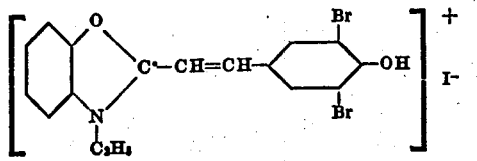

Color of the methanolic solution: orange-yellow.
Maximum sensitization: 525 mµ.

*Example 2*

4 g. of 2-methyl-4.5-diphenylthiazole ethyliodide and 3 g. of 3.5-dibromo-4-hydroxybenzaldehyde are dissolved while boiling in a mixture of 20 cc. of pyridine and 20 cc. of alcohol. The mass is then mixed with 2 cc. of piperidine and heated at 90° C. for 1 hour. On cooling the following dyestuff crystallizes out:

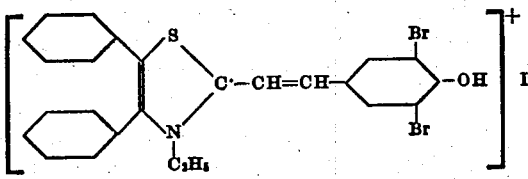

Color of the methanolic solution: red-violet.
Maximum sensitization: 580 mµ.

*Example 3*

A mixture of 4.5 g. of 2-methyl-β-naphthothiazole ethyliodide, 3 g. of 3.5-dibromo-4-hydroxybenzaldehyde, 20 cc. of pyridine, 20 cc. of propanol, and 2 cc. of piperidine is boiled for half an hour. A dyestuff of the following formula crystallizes out:

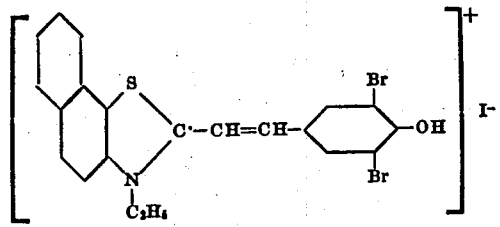

Color of the methanolic solution: red-violet.
Absorption maximum: 550 mµ.
Color of the pyridine solution: blue-violet.
Absorption maximum: 590 mµ.
Sensitization maximum: 590 mµ.

*Example 4*

A mixture of 1.5 g. of 2-methyl-4-phenyl-isofurodiazole and 1 cc. of dimethylsulfate is heated at 120° C. for half an hour. The mass is then mixed with 2 g. of dibromohydroxybenzaldehyde and kept at this temperature for half an hour. The dyestuff forms yellow crystals which dissolve in methanol containing some drops of pyridine with a dark yellow color. The formula is as follows:

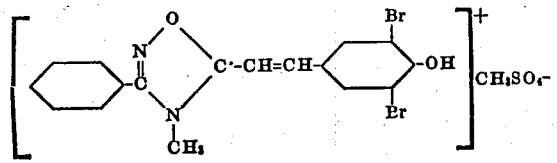

Absorption maximum: about 500 mµ.
Sensitization maximum: 520 mµ.

*Example 5*

An orange-red dyestuff of the following constitution is obtained by means of 2.5-dimethylthiodiazole in an analogous manner to that as described in Example 4:

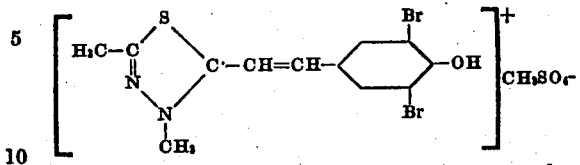

Color of the methanolic solution: orange-red.
Maximum sensitization: 545 mµ.

*Example 6*

A mixture of 3 g. of quinaldine ethyliodide, 3 g. of dibromohydroxybenzaldehyde, and 10 cc. of pyridine is boiled for half an hour. A violet-red dyestuff of the following constitution crystallizes out:

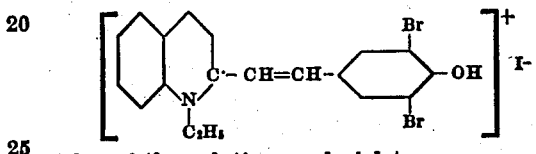

Color of the solution: red-violet.
Absorption maximum: about 550 mµ.
Sensitization maximum: about 585 mµ.

*Example 7*

A mixture of equimolecular amounts of 2-methylthiazoline methyliodide and 3.5-diiodo-4-hydroxybenzaldehyde and some drops of pyridine are melted together at 120° C. for 1 hour. The mass thus prepared is then dissolved in methanol. On addition of an ammonia solution of 1% strength a dyestuff of the following formula is obtained:

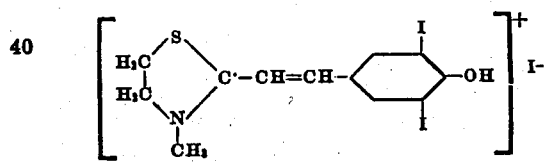

Color of the methanolic solution: pure yellow.
Maximum sensitization: 515 mµ.

*Example 8*

5 g. of 2.5.6-trimethylbenzselenazole ethyliodide are condensed with 5 g. of 3-bromo-4-hydroxybenzaldehyde in the presence of 10 cc. of pyridine. One obtains a red dyestuff of the following constitution:

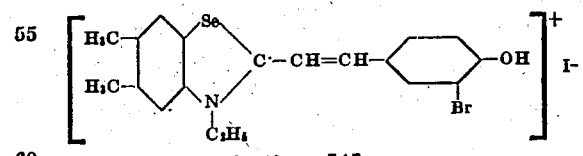

Maximum sensitization: 545 mµ.

*Example 9*

5 g. of 1.2.3.3-tetramethylindoliniumperchlorate and 6 g. of 3.5-dichloro-4-hydroxybenzaldehyde are condensed by heating at 110° C. for half an hour to form a violet-red dyestuff of the following constitution:

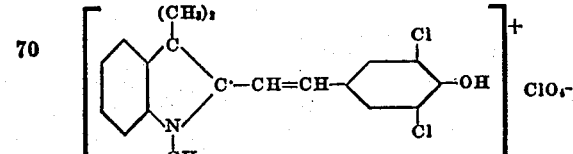

Color of the methanolic solution: intensive red.
Sensitization maximum: 550 mμ.

Example 10

A mixture of 7 g. of 2-methyl-6-phenylbenzoxazole and 5.2 g. of diethylsulfate is heated at 120° C. in an oil bath for one hour. 9 g. of 3.5-dibromo-4-hydroxybenzaldehyde and 3 cc. of pyridine are then added thereto. The whole is heated at 120° C. for a further hour. Finally the melt is dissolved in 200 cc. of a methanolic solution of sodium acetate of 12.5%. On standing an orange-red dyestuff of the following formula crystallizes out:

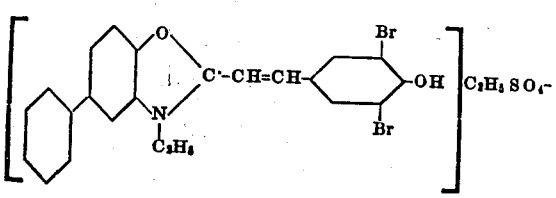

Absorption maximum: 500 mμ.
Sensitization maximum: 535 mμ.

Example 11

On replacing 2-methyl-6-phenylbenzoxazole in Example 10 of 2-methyl-6-chlorobenzoxazole an analogous dyestuff likewise yielding an orange-red solution and having the following formula is obtained:

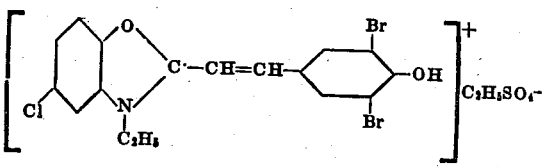

Absorption maximum: 500 mμ.
Sensitization maximum: 530 mμ.

Example 12

5 g. of 2-methyl-1-phenyl-benzimidazole and 5 cc. of dimethylsulfate are heated at 140° C. in an oil bath for one hour. 8 g. of the sodium salt of 3.5-dibromo-4-hydroxybenzaldehyde (obtained by precipitating an aqueous alkaline solution of the dibromohydroxybenzaldehyde with a concentrated solution of sodium hydroxide in excess), 20 cc. of pyridine and 5 cc. of piperidine are then added thereto and the whole is subsequently heated at 110° C. for 6 hours. After acidifying the mass with diluted acetic acid the precipitated dyestuff is sucked off, dissolved in methanol and slowly mixed with ether. Orange-red crystals dissolving in pyridine with an orange-red color are obtained. The dyestuff has the following formula:

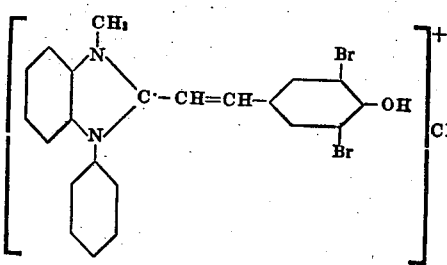

Absorption maximum in pyridine: 525 mμ.
Color of the methanolic solution: yellow.
Absorption maximum: 460 mμ.
Sensitization maximum: 525 mμ.

Example 13

A mixture of 5 g. of 2-methylbenzthiazole-β-propionyl bromide, 4 g. of 2-methyl-3.5-dibromo-4-hydroxybenzaldehyde and 2 cc. of pyridine is heated at 105° C. for half an hour. The melt is then rubbed together with propanol and the resulting dyestuff sucked off. It is of the following formula:

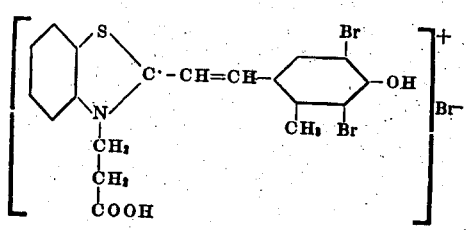

Color of the solution: carmine-red.
Maximum sensitization: 555 mμ.

Example 14

5 g. of 2-methylbenzthiazole-β-proprionylbromide and 5 g. of 3-bromo-4-hydroxy-5-ethoxybenzaldehyde are condensed in the manner as described in Example 13 to form a dyestuff of the following constitution:

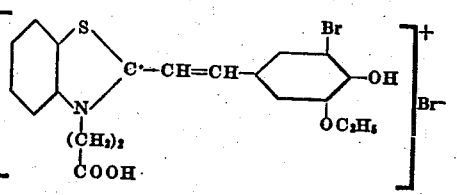

Color of the solution: deep red.
Maximum sensitization: 565 mμ.

Example 15

10 g. of 2-methylbenzthiazole ethyliodide and 10 g. of 3.5-dibromosalicylaldehyde are condensed with 20 g. of pyridine by heating for half an hour. The solution is then mixed with five times its weight of propanol and caused to crystallize out. The dyestuff thus obtained has the following formula:

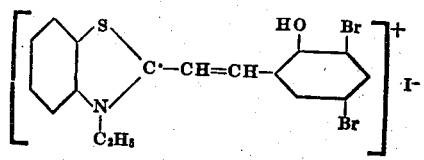

Maximum sensitization: about 547 mμ.

Example 16

When in Example 15 3.5-dibromoresorcylaldehyde is used instead of 3.5-dibromosalicylaldehyde, a dyestuff having the following constitution is produced:

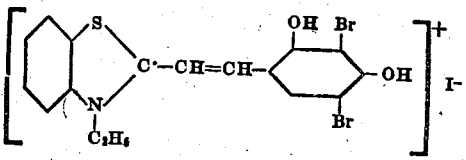

Maximum sensitization: about 555 mμ.

The new sensitizers are incorporated into the silver halide emulsions in the usual way. In general about 20–50 mg. of dyestuff are used for 1 kg. of emulsion.

I claim:

1. A photographic emulsion containing as the sensitizer a dyestuff of the following general formula:

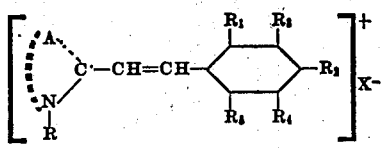

wherein A means groups of molecules necessary to complete a ring selected from the class consisting of a 5-membered and a 6-membered ring usual in cyanine dye art, R means a radical selected from the class consisting of alkyl, aryl, alkylenecarboxylic acid, $R_1$ and $R_2$ mean radicals selected from the class consisting of hydrogen and hydroxyl, at least one of said radicals always being hydroxyl, $R_3$ and $R_4$ mean radicals selected from the class consisting of hydrogen, halogen, alkyl and alkoxy, at least one of said radicals always being halogen, $R_5$ means a radical selected form the class consisting of hydrogen and alkyl, X means an anionic acid radical.

2. A photographic silver chloridebromide gelatin emulsion containing as the sensitizer a dyestuff as defined in claim 1.

3. A photographic paper comprising a silver chloridebromide gelatin emulsion layer containing as the sensitizer a dyestuff as defined in claim 1.

OSKAR RIESTER.